(12) United States Patent
Thompson

(10) Patent No.: US 8,474,112 B2
(45) Date of Patent: Jul. 2, 2013

(54) CARABINERS WITH MULTI MODE LOCKING SLEEVES, METHODS OF MANUFACTURING SUCH CARABINERS, AND METHODS OF USING SUCH CARABINERS

(75) Inventor: Rocke P. Thompson, Bountiful, UT (US)

(73) Assignee: Rock Exotica LLC, Clearfield, UT (US)

( * ) Notice: Subject to any disclaimer, the term of this patent is extended or adjusted under 35 U.S.C. 154(b) by 742 days.

(21) Appl. No.: 12/511,841

(22) Filed: Jul. 29, 2009

(65) Prior Publication Data
US 2011/0023275 A1 Feb. 3, 2011

(51) Int. Cl.
*F16B 45/02* (2006.01)
*A44B 13/02* (2006.01)
*A63B 29/00* (2006.01)

(52) U.S. Cl.
USPC ...... 24/600.2; 24/599.5; 24/601.1; 24/582.11

(58) Field of Classification Search
USPC ........... 24/599.9, 599.5, 600.2, 601.1, 582.11
See application file for complete search history.

(56) References Cited

U.S. PATENT DOCUMENTS

| | | | |
|---|---|---|---|
| 29,029 A | 7/1860 | Wynblad | |
| 1,442,101 A | 1/1923 | Smith | |
| 1,886,726 A | 11/1932 | Pennefather | |
| 2,006,013 A | 6/1935 | Claywell | |
| 2,706,318 A | 4/1955 | Coffing | |
| 2,791,817 A | 5/1957 | Burnham | |
| 3,008,210 A | 11/1961 | Stovern | |
| 4,930,194 A | 6/1990 | Frechin | |
| 5,005,266 A | 4/1991 | Fister et al. | |
| 5,187,844 A | 2/1993 | Simond | |
| 5,329,675 A | 7/1994 | McLean et al. | |
| 5,357,657 A | 10/1994 | Petzl | |
| 5,361,726 A | 11/1994 | Harris et al. | |
| 5,384,943 A | 1/1995 | LeFebvre et al. | |
| 5,416,955 A | 5/1995 | Katsma | |

(Continued)

FOREIGN PATENT DOCUMENTS

| | | |
|---|---|---|
| EP | 0 376 860 B1 | 2/1992 |
| EP | 0 976 936 A1 | 2/2000 |

(Continued)

OTHER PUBLICATIONS

Abseil & Belay Equipment, Dmm International, Jul. 2000, 2 pages.

(Continued)

*Primary Examiner* — Robert J Sandy
*Assistant Examiner* — Michael Lee
(74) *Attorney, Agent, or Firm* — TraskBritt

(57) ABSTRACT

Carabiners have a gate that is movable between a closed position and an open position, and a locking member that prevents opening of the gate when the gate is in the closed position and the locking member is in a locked position. The locking member is biased to the locked position. The locking member is also movable to a retainable unlocked position. Methods of manufacturing such carabiners include configuring a locking member of a carabiner to move between a locked position and a retainable unlocked position, and biasing the locking member to the locked position. Methods of using a carabiner include positioning a locking member in a retainable unlocked position, opening a gate of the carabiner, and allowing the locking member to at least substantially automatically move to a locked position as the gate is closed.

23 Claims, 6 Drawing Sheets

U.S. PATENT DOCUMENTS

| | | | |
|---|---|---|---|
| 5,463,798 A | 11/1995 | Wurzer | |
| 5,505,013 A | 4/1996 | Gois | |
| 5,577,304 A | 11/1996 | Simond | |
| 5,608,953 A | 3/1997 | Petzl et al. | |
| 5,664,304 A | 9/1997 | Tambornino | |
| 5,791,025 A | 8/1998 | Maurice et al. | |
| 5,896,630 A | 4/1999 | Smith et al. | |
| 5,913,479 A | 6/1999 | Westwood, III | |
| 5,927,431 A | 7/1999 | Klein, Jr. | |
| 6,161,264 A | 12/2000 | Choate | |
| 6,588,076 B1 | 7/2003 | Choate | |
| 6,601,274 B2 | 8/2003 | Gartsbeyn | |
| 6,622,354 B1 | 9/2003 | Klingier | |
| 7,228,601 B2 | 6/2007 | Thompson | |
| 7,320,159 B2 * | 1/2008 | Petzl et al. | 24/599.5 |
| 7,475,456 B2 | 1/2009 | Thompson | |
| 7,540,074 B2 | 6/2009 | Thompson | |
| 7,743,475 B2 * | 6/2010 | Jang et al. | 24/599.9 |
| 7,992,267 B2 * | 8/2011 | Christianson | 24/598.2 |
| 8,016,073 B2 * | 9/2011 | Petzl et al. | 182/3 |
| 2002/0050032 A1 | 5/2002 | Carnall | |
| 2002/0073520 A1 | 6/2002 | Hall | |
| 2003/0106190 A1 | 6/2003 | Christianson | |
| 2003/0167608 A1 | 9/2003 | Petzl et al. | |
| 2004/0143945 A1 | 7/2004 | Christianson | |
| 2005/0246875 A1 | 11/2005 | Brown | |
| 2008/0022497 A1 | 1/2008 | Thompson | |
| 2008/0104810 A1 * | 5/2008 | Liang | 24/600.2 |

FOREIGN PATENT DOCUMENTS

| | | |
|---|---|---|
| EP | 1 178 227 A1 | 6/2002 |
| EP | 1 229 258 A2 | 8/2002 |
| FR | 2 856 309 A | 12/2004 |

OTHER PUBLICATIONS

Black Diamond, "LiveWire Carabiner," <<http://www.bdel.com/gear/livewire.php>> 2005.

Captive Eye, Dmm Industrial Website, accessed on or before Jan 20, 2005, 1 page.

DMM Belay Master Karabiners, DMM International, accessed on or before Jan. 20, 2005, 11 pages.

Locking Carabiners, DMMIndustrial Website, accessed on or before Jan. 20, 2005, 1 page.

PCT International Search Report for International Application No. PCT/US2005/003116 dated May 31, 2005 (4 pages).

Rescue Equipment, CMC Rescue XL Steel Carabiner, CMC Rescue Inc., 2003, 1 page, cmcrescue.com.

* cited by examiner

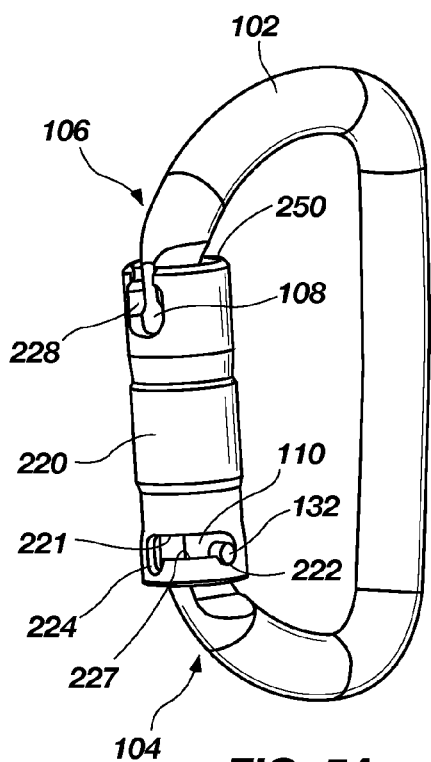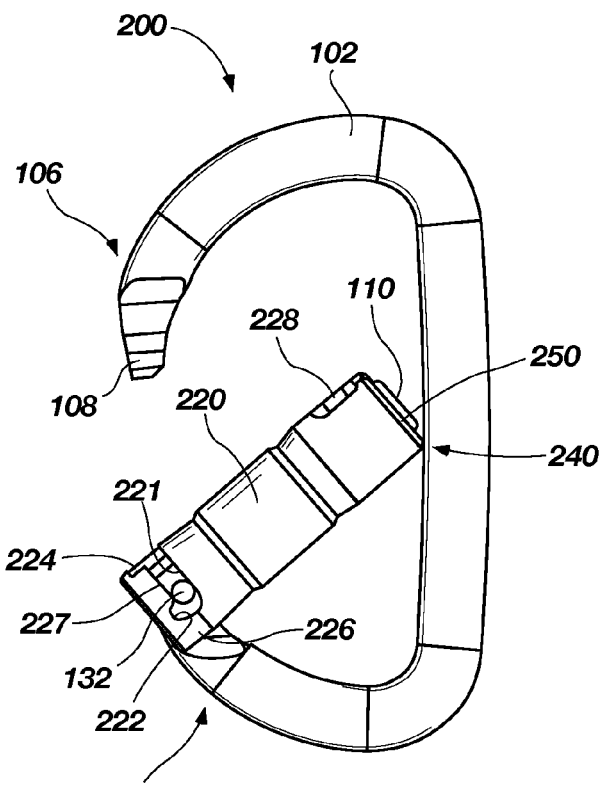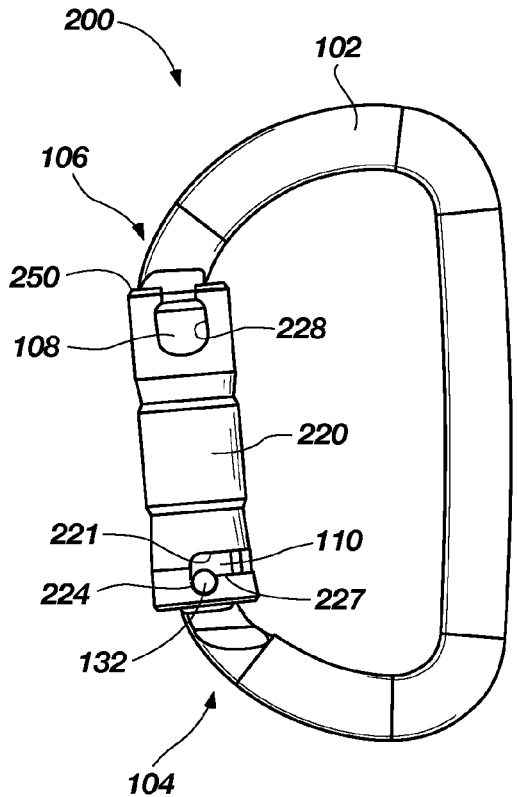
FIG. 5A
FIG. 5B
FIG. 5C

US 8,474,112 B2

CARABINERS WITH MULTI MODE LOCKING SLEEVES, METHODS OF MANUFACTURING SUCH CARABINERS, AND METHODS OF USING SUCH CARABINERS

TECHNICAL FIELD

Embodiments of the invention relate to carabiners, to methods of manufacturing carabiners, and to methods of using carabiners.

BACKGROUND

Carabiners are ring-like devices that have a gate that can be opened and closed to allow, for example, a bight of rope to be passed through the gate such that the rope extends through the carabiner without having to thread an end of the rope through the carabiner. Carabiners are used in various applications. Carabiners are often used in outdoor recreational activities such as rock climbing, mountaineering, and sailing. Carabiners are also employed, however, in non-recreational applications such as, for example, rescue operations and military applications.

Generally, a carabiner has a C-shaped ring body having a first end and a second end with an opening therebetween. A gate is pivotally attached to one end of the ring body and extends across the opening in the ring body to the other end of the ring body, such that the gate may be selectively opened to allow articles to pass through the opening between the ends of the ring body, or closed to prevent articles from passing through the opening between the ends of the ring body. The gate may be biased to the closed position using, for example, a spring positioned and configured to urge the gate to the closed position.

To avoid inadvertent opening of the gate of a carabiner, it is known in the art to provide a locking sleeve on the gate. The locking sleeve may be movable between a locked position and an unlocked position. In the locked position, the locking sleeve prevents the gate from moving from the closed position to the open position, but allows the gate to move from the closed position to the open position when the locking sleeve is in the unlocked position. In some carabiners, the locking sleeve is threaded onto the gate, such that the locking sleeve is rotated in a first direction about the gate by a user to move the locking sleeve into the locked position, and rotated in an opposite, second direction about the gate by the user to move the locking sleeve into the unlocked position. In other carabiners, the locking sleeve is configured to slide in a longitudinal direction relative to the gate between the locked and unlocked positions. In such embodiments, the locking sleeve may be biased to the locked position using, for example, a spring positioned and configured to urge the locking sleeve to the locked position.

Examples of carabiners that include locking sleeves are disclosed in, for example, U.S. patent application Ser. No. 11/291,493, filed Dec. 1, 2005 (published Jun. 29, 2006 as United States Patent Application Publication No. U.S. 2006/0137151 A1); U.S. patent application Ser. No. 11/827,380, filed Jul. 10, 2007 (published Jan. 31, 2008 as United States Patent Application Publication No. U.S. 2008/0022497 A1); and U.S. Pat. No. 6,588,076 to Choate, which issued Jul. 8, 2003.

BRIEF SUMMARY

In some embodiments, the present invention includes carabiners having a gate that is pivotally attached to a first end of a body and movable between a closed position and an open position, and a locking sleeve that is movable between a locked position and a retainable unlocked position. In the closed position, the gate extends from the first end to a second end of the body. The locking member is biased to the locked position, and is configured to prevent the gate from opening when the gate is in the closed position and the locking member is in the locked position, and to allow the gate to open when the gate is in the closed position and the locking member is in the retainable unlocked position. The locking sleeve is configured to move out of the retainable unlocked position when the gate is pivoted relative to the body of the carabiner beyond a threshold angle as the gate is opened.

In additional embodiments, the present invention includes methods of manufacturing carabiners. A gate is pivotally attached to a first end of a body of a carabiner, and the gate is configured to pivot relative to the body between a closed position and an open position. A locking member is attached to at least one of the gate and the body of the carabiner. The locking member is configured to move relative to the gate between a locked position and a retainable unlocked position, and is biased to the locked position. The locking member is further configured to prevent the gate from opening when the gate is in the closed position and the locking member is in the locked position, and to allow the gate to open when the gate is in the closed position and the locking member is in the retainable unlocked position. The locking sleeve is configured to move out of the retainable unlocked position when the gate is pivoted relative to the body of the carabiner beyond a threshold angle upon opening the gate.

In yet further embodiments, the present invention includes methods of using a carabiner in which a locking sleeve of a carabiner is positioned in a retainable unlocked position. A gate of the carabiner is opened while the carabiner is in the retainable unlocked position, the locking sleeve of the carabiner is moved out of the retainable unlocked position by pivoting the gate relative to a body of the carabiner beyond a threshold angle, and the locking sleeve is allowed to at least substantially automatically move to a locked position as the gate is moved to a closed position.

These features, advantages, and aspects of particular embodiments of the present invention will be apparent to those in the art from a consideration of the detailed description set forth below when considered together with the accompanying drawings.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the description of embodiments of the invention when read in conjunction with the accompanying drawings, in which:

FIG. 1A is a side plan view of the carabiner;

FIG. 1B is an end plan view of the carabiner;

FIG. 1C is a plan view of a side of the carabiner opposite that shown in FIG. 1A;

FIG. 2A is a side plan view of the carabiner;

FIG. 2B is an end plan view of the carabiner;

FIG. 2C is a plan view of a side of the carabiner opposite that shown in FIG. 2A;

FIG. 3A is a side plan view of the carabiner;

FIG. 3B is an end plan view of the carabiner;

FIG. 3C is a plan view of a side of the carabiner opposite that shown in FIG. 3A;

FIGS. 5A through 5C illustrate another embodiment of a carabiner of the present invention;

FIG. 5A is a perspective view of the carabiner and shows a gate of the carabiner in a closed position and a locking sleeve of the carabiner in a retainable unlocked position;

FIG. 5B is a side plan view of the carabiner showing the gate in an open position and the locking sleeve moving out from the retainable unlocked position; and FIG. 5C is a side plan view like that of FIG. 5B and shows the gate in the closed position and the locking sleeve in a locked position.

FIG. 6A is a perspective view of the carabiner and shows a gate of the carabiner in a closed position and a locking sleeve of the carabiner in a retainable unlocked position;

FIG. 6B is a side plan view of the carabiner showing the gate in an open position and the locking sleeve moving out from the retainable unlocked position; and FIG. 6C is a side plan view like that of FIG. 6B and shows the gate in the closed position and the locking sleeve in a locked position.

DETAILED DESCRIPTION OF THE INVENTION

The illustrations presented herein are not meant to be actual views of any particular material, apparatus, system, or method, but are merely idealized representations which are employed to describe the present invention. Additionally, elements common between figures may retain the same numerical designation.

The present invention, in a number of embodiments, includes carabiners having a locking sleeve that can be retained in an unlocked position without application of force to the locking sleeve by a user, but that are biased to a locked position such that, as a user urges the locking sleeve out of the unlocked position, the carabiner substantially automatically moves to the locked position.

Figure 1A:
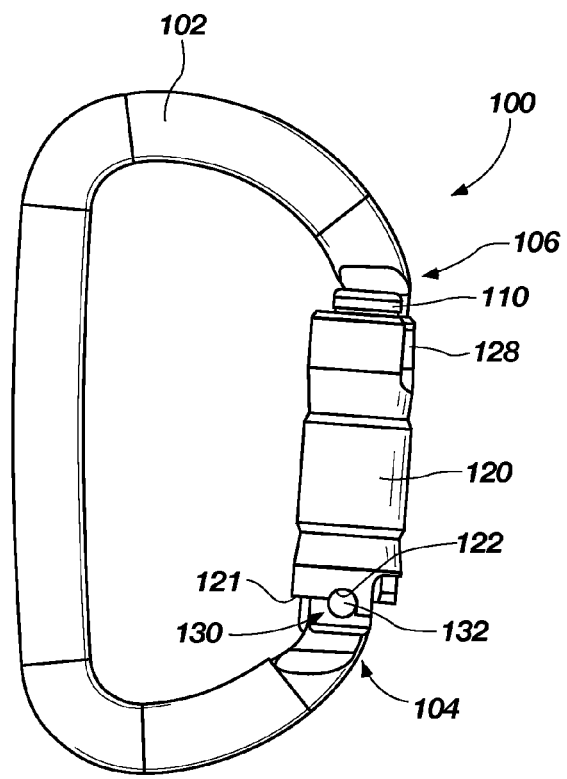
FIGS. 1A through 1C illustrate an embodiment of a carabiner of the present invention and shows a gate of the carabiner in a closed position, and a locking sleeve of the carabiner in a retainable unlocked position.
Figure 1B:
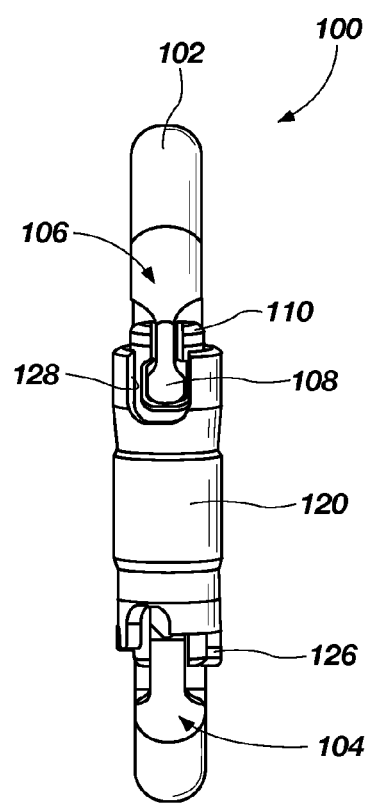
Figure 1C:
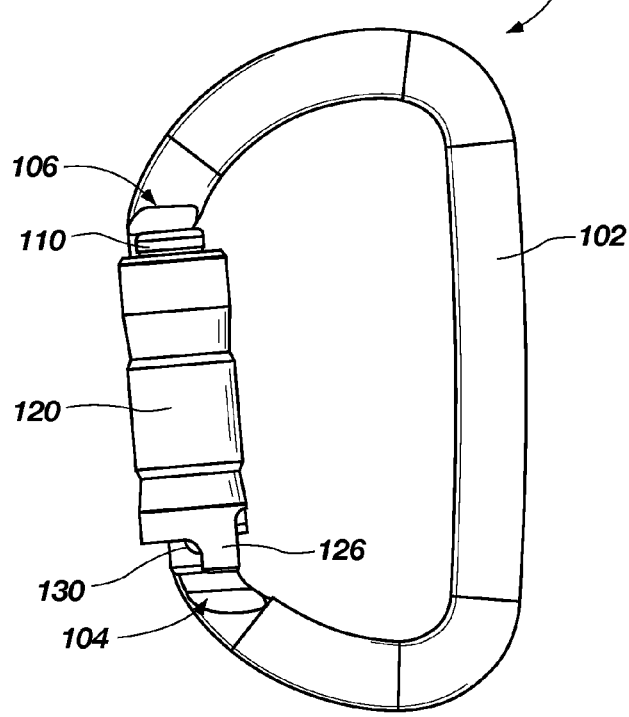
Figure 2A:
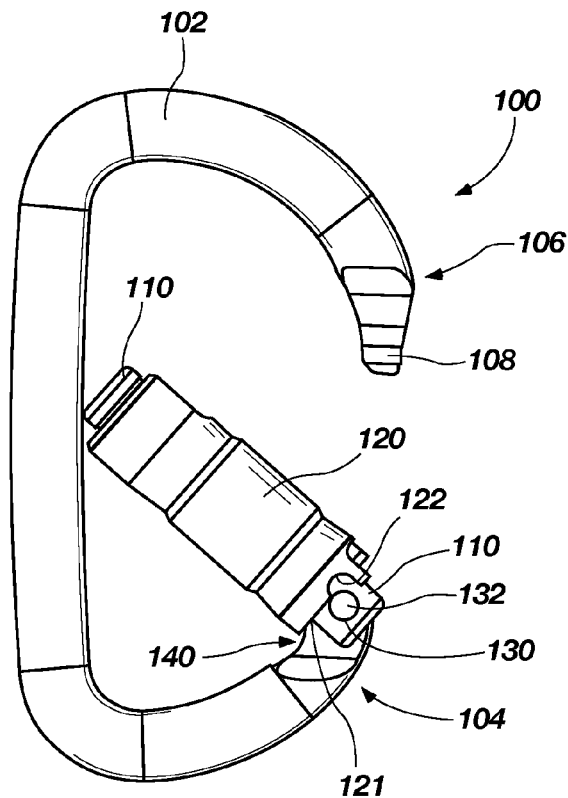
FIGS. 2A through 2C illustrate the carabiner of FIGS. 1A through 1C, and shows the gate of the carabiner in an open position.
Figure 2B:
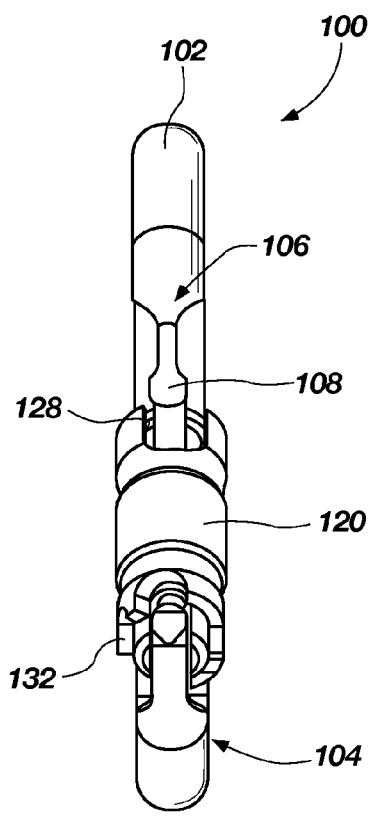
Figure 2C:
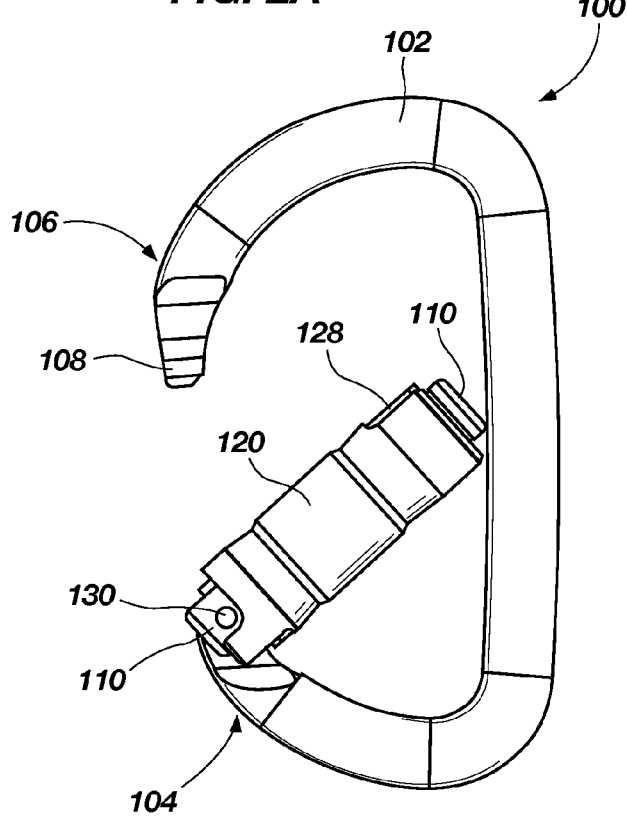
Figure 3A:
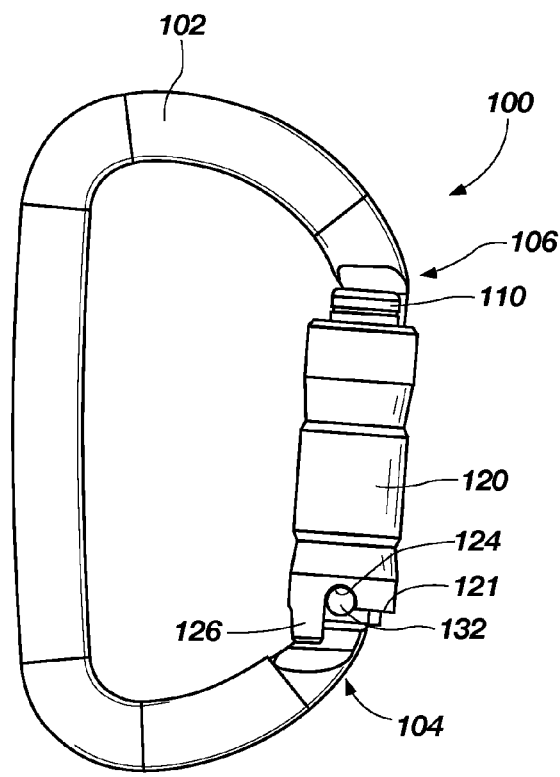
FIGS. 3A through 3C illustrate the carabiner of FIGS. 1A through 1C and 2A through 2C, and show the gate of the carabiner in a closed position, and the locking sleeve of the carabiner in a locked position.
Figure 3B:
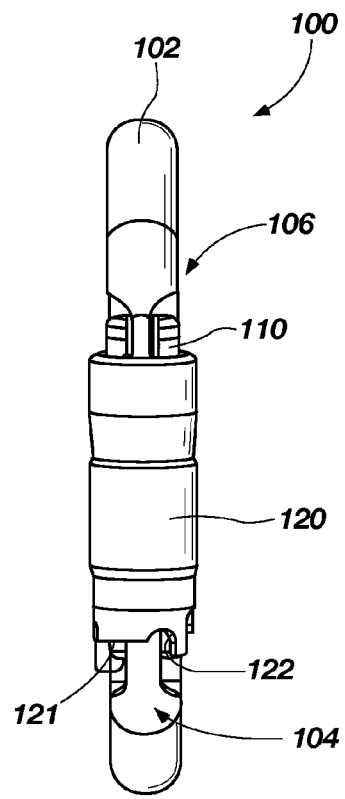
Figure 3C:
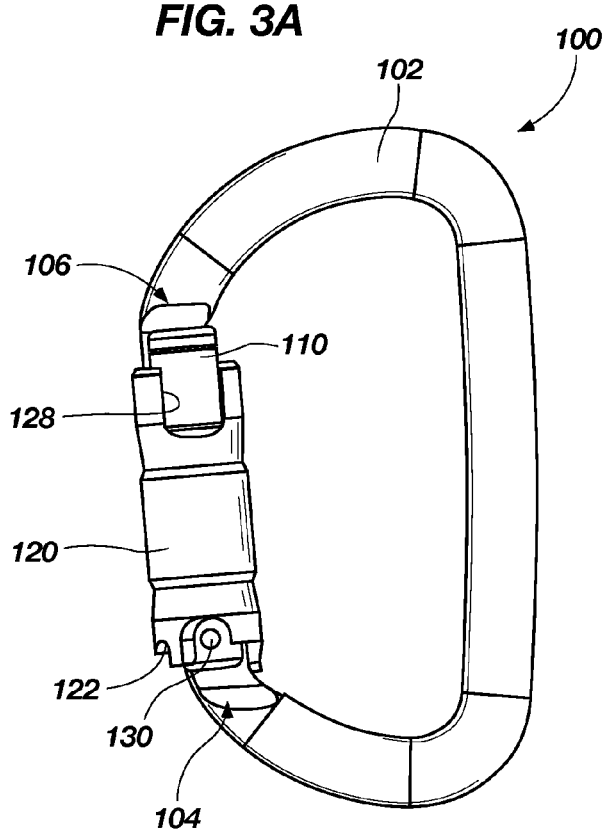

FIGS. 1A through 1C, 2A through 2C, and 3A through 3C illustrate an embodiment of a carabiner 100 of the present invention. As discussed in further detail below, the carabiner 100 has a generally C-shaped body 102, a gate 110 that is movable between a closed position and an open position, and a locking sleeve 120 that is movable between a locked position and a retainable unlocked position. FIGS. 1A through 1C illustrate the carabiner 100 with the gate 110 in the closed position and the locking sleeve 120 retained in a retainable unlocked position. FIGS. 2A through 2C illustrate the carabiner 100 with the gate 110 in an open position and the locking sleeve 120 in the process of being urged out from the retainable unlocked position. FIGS. 3A through 3C illustrate the carabiner 100 with the gate 110 in the closed position and the locking sleeve 120 in the locked position.

Referring to FIG. 1A, the carabiner 100 includes a generally C-shaped body 102 having a first end 104 and a second end 106 that are separated from one another by an opening that is not visible in FIGS. 1A through 1C, as the opening is closed by the gate 110 in FIGS. 1A through 1C. The generally C-shaped body 102 may be formed from and comprise a metal or metal alloy such as, for example, an aluminum-based alloy, an iron-based alloy, a nickel-based alloy, a cobalt-based alloy, a magnesium-based alloy, a titanium-based alloy, etc. In other embodiments, the generally C-shaped body 102 may be formed from and comprise a polymer material, or a composite material such as, for example, a fiber or whisker (e.g., carbon fiber) reinforced polymer (e.g., epoxy) or metal alloy material.

The first end 104 of the body 102 is configured for attachment to an end of the gate 110 (the lower end from the perspectives of FIGS. 1A through 1C), and the second end 106 of the body 102 is configured to interact with another, opposite end of the gate 110 (the upper end from the perspectives of FIGS. 1A through 1C).

The lower end of the gate 110 may be pivotally attached to the first end 104 of the body 102 using, for example, a pin member 130 (e.g., a rivet) that extends through the first end 104 of the body 102 and through the lower end of the gate 110. As shown in FIG. 1A, the pin member 130 may include a head 132 that projects laterally outward from the first end 104 of the body 102 on one side thereof (e.g., the side shown in FIG. 1A). The pin member 130 may be substantially flush with the surface of the first end 104 of the body 102 on an opposite side of the body 102 (e.g., on the side shown in FIG. 1C). The head 132 of the pin member 130 may interact with features of the locking sleeve 120, as discussed in further detail herein below.

The second end 106 of the body 102 may include what is referred to in the art as a "nose" 108 that is configured to be received within a receptacle 112 (FIG. 4) formed in the upper end of the gate 110 when the gate 110 is in the closed position. An aperture 128 is formed in the upper end of the locking sleeve 120 to allow the nose 108 to be received into the receptacle 112 of the gate 110 as the gate 110 moves from the open position into the closed position, but the upper end of the gate 110 is configured to preclude the nose 108 from passing through the upper end of the gate 110. For example, the receptacle 112 in the gate 110 does not extend entirely through the gate 110. As a result, the gate 110 is only capable of pivoting inward into the area enclosed by the C-shaped body 102 and is precluded from pivoting outward relative to the C-shaped body 102.

As shown in FIG. 1A, the locking sleeve 120 is carried by, and positioned concentrically about, the gate 110. The locking sleeve 120 and the gate 110 are configured such that the locking sleeve 120 can rotate circumferentially about the gate 110, and such that the locking sleeve 120 can slide longitudinally along the gate 110.

Figure 4:
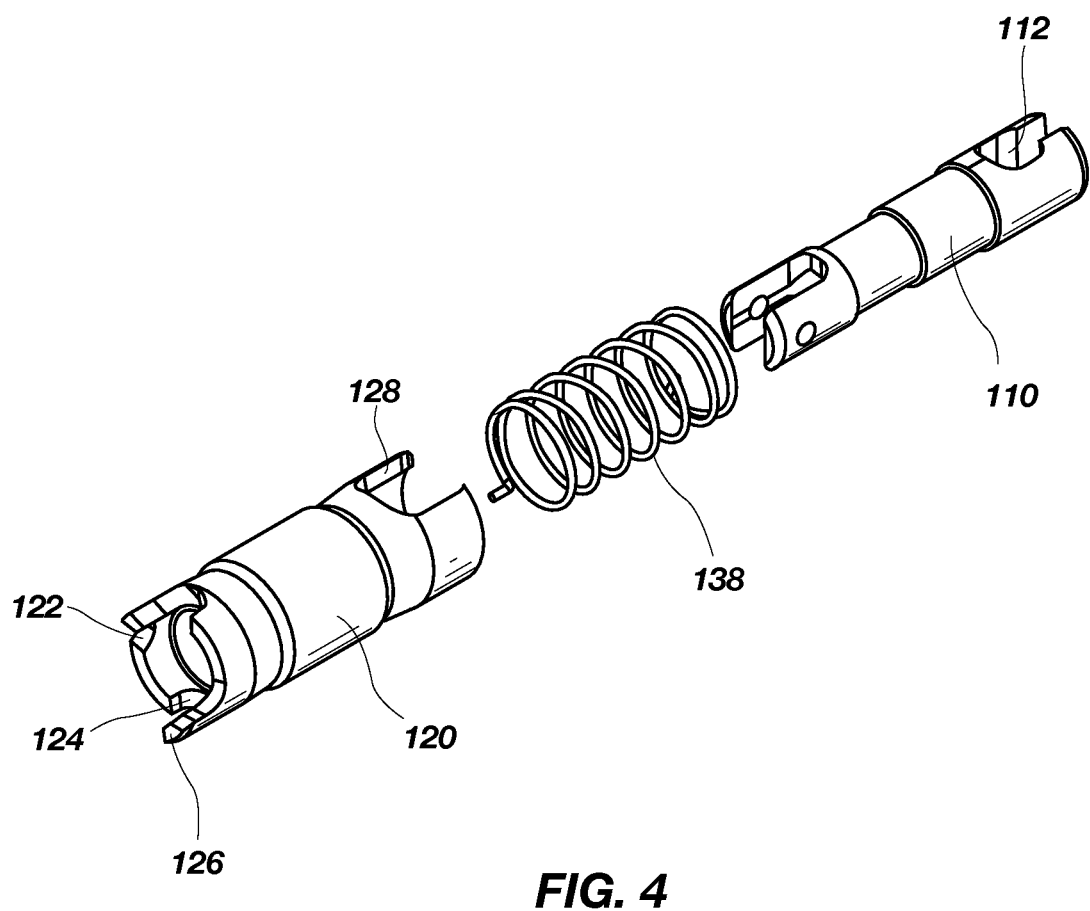
FIG. 4 is an exploded view of the gate, the locking sleeve, and a spring member of the carabiner shown in FIGS. 1A through 1C, 2A through 2C, and 3A through 3C.

FIG. 4 is an exploded view of the gate 110, the locking sleeve 120, and a spring member 138 that is disposed between the gate 110 and the locking sleeve 120. The spring member 138 is hidden from view in FIGS. 1A through 1C. In the embodiment shown in FIG. 4, the spring member 138 is a torsion spring that acts on both the gate 110 and the locking sleeve 120 in such a manner as to bias the locking sleeve 120 toward the first end 104 of the body 102 (the downward direction in the perspectives of FIGS. 1A through 1C), and also to rotationally bias the locking sleeve 120 in a counter-clockwise rotational direction about the gate 110 (when looking at the end surfaces of the gate 110 and locking sleeve 120 proximate the second end 106 of the body 102).

Referring again to FIG. 1A, in the absence of an applied external force, the spring member 138 forces the locking sleeve 120 toward the first end 104 of the body 102 (in the downward direction in the perspectives of FIGS. 1A through 1C) to cause a lower surface 121 of the locking sleeve 120 to abut against the head 132 of the pin member 130, which prevents the locking sleeve 120 from further movement toward the first end 104 of the body 102. A user, however, can apply an external force to the locking sleeve 120 to cause the locking sleeve 120 to slide toward the second end 106 of the body 102 (in the upward direction in the perspectives of FIGS. 1A through 1C).

Also, in the absence of an applied external force, the spring member 138 (FIG. 4) forces the locking sleeve 120 to rotate in the counter-clockwise direction (when looking at the end surfaces of the gate 110 and locking sleeve 120 proximate the second end 106 of the body 102). The lower surface 121 of the locking sleeve 120 is configured with a profile that includes features configured to interact with the head 132 of the pin member 130 in such a manner as to preclude rotation of the locking sleeve 120 about the gate 110 in the absence of an applied external force. For example, the lower surface 121 of the locking sleeve 120 includes a first notch 122 (e.g., an indentation) shown in FIG. 1A. When the locking sleeve 120 is in the retainable unlocked position shown in FIGS. 1A through 1C, the head 132 of the pin member 130 is disposed within the first notch 122. As the spring member 138 forces the lower surface 121 within the notch 122 of the locking sleeve 120 against the head 132 of the pin member 130, the notch 122 prevents the locking sleeve 120 from rotating in the counter-clockwise direction responsive to the rotational forces applied to the locking sleeve 120 by the spring member 138. If, however, the locking sleeve 120 is moved relative to the gate 110 such that the head 132 of the pin member 130 is not disposed within the first notch 122, the spring member 138 may urge the locking sleeve 120 to rotate in the counter-clockwise direction about the gate 110 until the head 132 of the pin member 130 impinges on another feature of the lower surface 121 of the locking sleeve 120 (e.g., a second notch 124 shown in FIG. 3A) that precludes further rotation of the locking sleeve 120 in the counter-clockwise direction.

Referring to FIG. 1B, an aperture 128 is provided in the end of the locking sleeve 120 proximate the second end 106 of the body 102 (the upper end in the perspectives of FIGS. 1A through 1C). The aperture 128 is configured to allow the nose 108 at the second end 106 of the body 102 to pass therethrough when the aperture 128 is aligned with the nose 108 as shown in FIG. 1B. The aperture 128 is aligned with the nose 108 when the locking sleeve 120 is in the retainable unlocked position shown in FIGS. 1A through 1C. Thus, when the locking sleeve 120 is in the retainable unlocked position shown in FIGS. 1A through 1C, a user of the carabiner 100 can pull the locking sleeve 120 and the gate 110 into an interior area enclosed by the body 102 of the carabiner 100. In other words, a user can move the gate 110 into an open position shown in FIGS. 2A through 2C when the locking sleeve 120 is in the retainable unlocked position shown in FIGS. 1A through 1C.

Referring to FIGS. 2A through 2C, as long as the locking sleeve 120 is not moved out of the retainable unlocked position shown in FIGS. 1A through 1C relative to the gate 110 (i.e., as long as the head 132 of the pin member 130 remains disposed within the first notch 122 in the surface 121 of the locking sleeve 120), the gate 110 can be freely moved back and forth between the closed position shown in FIGS. 1A through 1C and the open position shown in FIGS. 2A through 2C.

In some embodiments, the carabiner 100 may be configured such that, as the gate 110 is moved into the open position shown in FIGS. 2A through 2C, the head 132 of the pin member 130 may be urged out from the notch 122 in the surface 121 of the locking sleeve 120 if the gate 110 (and locking sleeve 120) is pivoted to or beyond a threshold angle relative to the body 102 of the carabiner 100. By way of example and not limitation, the locking sleeve 120 and the first end 104 of the body 102 may be sized and configured such that, as the gate 110 (and locking sleeve 120) is pivoted to a threshold angle relative to the body 102 of the carabiner 100, as shown in FIG. 2A, the lower surface 121 of the locking sleeve 120 will abut against the body 102 proximate the first end 104 thereof at a pinch point 140. If the gate 110 (and locking sleeve 120) is further pivoted inward beyond the threshold angle relative to the body 102, the contact between the body 102 and the locking sleeve 120 at the pinch point 140 will cause the locking sleeve 120 to slide longitudinally along the gate 110 away from the pin member 130 such that the head 132 of the pin member 130 is urged out from the first notch 122 in the lower surface 121 of the locking sleeve 120. After the head 132 of the pin member 130 is urged out from the first notch 122 in the lower surface 121 of the locking sleeve 120, the spring member 138 (FIG. 4) between the gate 110 and the locking sleeve 120 will prevent the head 132 of the pin member 130 from returning to the notch 122 in the absence of an applied external force, and will urge the locking sleeve 120 to rotate to the locked position shown in FIGS. 3A through 3C.

As shown in FIG. 2C, however, when the gate 110 (and the locking sleeve 120) is in the open position shown in FIGS. 2A through 2C, a projection 126 (FIG. 1C) of the locking sleeve 120 that extends downward (from the perspective of FIG. 2C) past the pin member 130 and laterally beside the first end 104 of the body 102 prevents the locking sleeve 120 from rotating about the gate 110 responsive to the forces applied by the spring member 138 (FIG. 4) until the gate 110 (and the locking sleeve 120) has pivoted back toward the closed position to an extent that the nose 108 of the second end 106 of the body 102 has passed at least partially through the aperture 128 in the end of the locking sleeve 120 proximate the second end 106 of the body 102. Stated another way, the projection 126 may be sized and configured to pass over the body 102 only after the gate 110 (and the locking sleeve 120) has pivoted back toward the closed position and the nose 108 has passed at least partially through the aperture 128. Thus, the projection 126 maintains the aperture 128 in the locking sleeve 120 in alignment with the nose 108 until the nose 108 has passed at least partially through the aperture 128. If the aperture 128 were not maintained in alignment with the nose 108 until the nose 128 had passed at least partially through the aperture 128, the spring member 138 could cause the locking sleeve 120 to rotate relative to the gate 110 such that the aperture 128 were not aligned with the nose 108, in which case interference between the nose 108 and the end of the locking sleeve 120 proximate the second end 106 of the body 102 would prevent the gate 110 (and the locking sleeve 120) from returning to the closed position.

As the projection 126 clears the body 102, the nose 108 will be partially disposed within the aperture 128. Interference between the nose 108 and the surfaces of the locking sleeve 120 within the aperture 128, however, will prevent the locking sleeve 120 from further rotation about the gate 110 response to the forces acting on the locking sleeve 120 until the nose 108 has passed entirely through the aperture 128 in the locking sleeve 120.

As the gate 110 moves from the open position shown in FIGS. 2A through 2C into the closed position shown in FIGS.

3A through 3C, the nose 108 of the second end 106 of the body 102 will pass entirely through the aperture 128 in the locking sleeve 120, at which point, the spring member 138 (FIG. 4) between the gate 110 and the locking sleeve 120 will cause the locking sleeve 120 to further rotate in the counter-clockwise direction about the gate 110 until the head 132 of the pin member 130 is forced into a second notch 124 in the lower surface 121 of the locking sleeve 120. The second notch 124 may be disposed adjacent the projection 126 such that the projection 126 prevents further rotation of the locking sleeve 120 about the gate 110 in the counter-clockwise direction. When the head 132 of the pin member 130 is disposed within the second notch 124, the locking sleeve 120 is in a locked position in which the aperture 128 is not aligned with the nose 108 and the end of the locking sleeve 120 proximate the second end 106 of the body 102 locks the gate 110 to the nose 108 in the closed position. Thus, when the gate 110 is closed and the locking sleeve 120 is in the locked position, as shown in FIGS. 3A through 3C, the locking sleeve 120 prevents the gate 110 from inadvertently being opened.

To unlock the locking sleeve 120 and open the gate 110, a user may apply a force to the locking sleeve 120 to move the locking sleeve 120 out of the locked position shown in FIGS. 3A through 3C and to rotate the locking sleeve 120 about the gate 110 until the aperture 128 in the locking sleeve 120 is aligned with the nose 108, at which point the gate 110 may be opened. In particular, a user may apply a force to the locking sleeve 120 to cause the locking sleeve 120 to slide longitudinally along the gate 110 toward the second end 106 of the body 102, and to cause the locking sleeve 120 to rotate in the clockwise direction about the gate 110 in such a manner as to cause the head 132 of the pin member 130 to be dislodged out of the second notch 124, to align the aperture 128 with the nose 108, and to open the gate 110.

Optionally, a user may move the locking sleeve 120 from the locked position shown in FIGS. 3A through 3C to the retainable unlocked position shown in FIGS. 1A through 1C, in which the head 132 of the pin member 130 is lodged within the first notch 122 in the locking sleeve 120. If the user lodges the head 132 of the pin member 130 within the first notch 122 in the locking sleeve 120 before or after moving the gate 110 to the open position, the locking sleeve 120 may be freely opened and closed, as previously described herein, without causing the locking sleeve 120 to move into the locked position (shown in FIGS. 3A through 3C) until the locking sleeve 120 is pivoted relative to the body 102 beyond the threshold angle. If, however, the user does not lodge the head 132 of the pin member 130 within the first notch 122 in the locking sleeve 120 before or after moving the gate 110 to the open position, the locking sleeve 120 will return to the locked position shown in FIGS. 3A through 3C when the gate 110 returns to the closed position after the user opens the gate 110.

FIGS. 5A through 5C illustrate another embodiment of a carabiner 200 of the present invention. The carabiner 200 is generally similar to the carabiner 100 previously described herein, and has a generally C-shaped body 102 and a gate 110 substantially similar to those of the carabiner 100. The carabiner 200 also includes a locking sleeve 220 that is movable between a locked position and a retainable unlocked position. In the carabiner 200, however, the locking sleeve 220 is biased toward the second end 106 of the body 102, instead of toward the first end 104 of the body 102, as is the locking sleeve 220 of the carabiner 100. FIG. 5A illustrates the carabiner 200 with the gate 110 in the closed position and the locking sleeve 220 retained in a retainable unlocked position. FIG. 5B illustrates the carabiner 200 with the gate 110 in an open position and the locking sleeve 220 in the process of being urged out from the retainable unlocked position. FIG. 5C illustrates the carabiner 200 with the gate 110 in the closed position and the locking sleeve 220 in the locked position.

Referring to FIG. 5A, the lower end of the gate 110 may be pivotally attached to the first end 104 of the body 102 using, for example, a pin member (e.g., a rivet) (like the pin member 130 of FIGS. 1A through 1C) that extends through the first end 104 of the body 102 and through the lower end of the gate 110. As shown in FIG. 5A, the pin member may include a head 132 that projects laterally outward from the first end 104 of the body 102 on one side thereof (e.g., the side shown in FIG. 5A). The pin member may be substantially flush with the surface of the first end 104 of the body 102 on an opposite side of the body 102. The head 132 of the pin member may interact with features of the locking sleeve 220, as discussed in further detail herein below.

The second end 106 of the body 102 may include a nose 108 that is configured to be received within a receptacle (not visible in FIGS. 5A through 5C) (like the receptacle 112 shown in FIG. 4) formed in the upper end of the gate 110 when the gate 110 is in the closed position. An aperture 228 is formed in the upper end of the locking sleeve 220 to allow the nose 108 to be received into the receptacle of the gate 110 as the gate 110 moves from the open position into the closed position, but the upper end of the gate 110 is configured to preclude the nose 108 from passing through the upper end of the gate 110.

The locking sleeve 220 is carried by, and positioned concentrically about, the gate 110. The locking sleeve 220 and the gate 110 are configured such that the locking sleeve 220 can rotate circumferentially about the gate 110, and such that the locking sleeve 220 can slide longitudinally along the gate 110.

A spring member (like the spring member 138 of FIG. 4) is disposed between the gate 110 and the locking sleeve 220. The spring member is hidden from view in FIGS. 5A through 5C. The spring member may comprise a torsion spring that acts on both the gate 110 and the locking sleeve 220 in such a manner as to bias the locking sleeve 220 toward the second end 106 of the body 102 (the upward direction in the perspectives of FIGS. 5A through 5C), and also to rotationally bias the locking sleeve 220 in a counter-clockwise rotational direction about the gate 110 (when looking at the end surfaces of the gate 110 and locking sleeve 220 proximate the second end 106 of the body 102).

With continued reference to FIG. 5A, an elongated aperture 221 (e.g., a slot) is formed through the end of the locking sleeve 220 proximate the first end 104 of the body 102, and the locking sleeve 220 is assembled with the gate 110 and the pin member such that the head 132 of the pin member is disposed within the elongated aperture 221. Thus, in the absence of an applied external force, the spring member forces the locking sleeve 220 toward the second end 106 of the body 102 (in the upward direction in the perspectives of FIGS. 5A through 5C) to cause a lower surface 227 of the locking sleeve 220 within the elongated aperture 221 to abut against the head 132 of the pin member, which prevents the locking sleeve 220 from further movement toward the second end 104 of the body 102. A user, however, can apply an external force to the locking sleeve 220 to cause the locking sleeve 220 to slide toward the first end 104 of the body 102 (in the downward direction in the perspectives of FIGS. 5A through 5C).

Also, in the absence of an applied external force, the spring member forces the locking sleeve 220 to rotate in the counter-clockwise direction (when looking at the end surfaces of the gate 110 and locking sleeve 220 proximate the second end 106 of the body 102). The lower surface 227 of the locking sleeve 220 is configured with a profile that includes features configured to interact with the head 132 of the pin member in such a manner as to preclude rotation of the locking sleeve 220 about the gate 110 in the absence of an applied external force. For example, the lower surface 227 of the locking sleeve 220 within the elongated aperture 221 includes a first notch 222 (e.g., an indentation) shown in FIGS. 5A and 5B. When the locking sleeve 220 is in the retainable unlocked position shown in FIG. 5A, the head 132 of the pin member is disposed within the first notch 222. As the spring member forces the lower surface 227 of the locking sleeve 220 within the notch 222 against the head 132 of the pin member, the notch 222 prevents the locking sleeve 220 from rotating in the counter-clockwise direction responsive to the rotational forces applied to the locking sleeve 220 by the spring member. If, however, the locking sleeve 220 is moved relative to the gate 110 such that the head 132 of the pin member is not disposed within the first notch 222, the spring member may urge the locking sleeve 220 to rotate in the counter-clockwise direction about the gate 110 until the head 132 of the pin member impinges on another feature of the lower surface 227 of the locking sleeve 220 within the elongated aperture 221 (e.g., a second notch 224 shown in FIGS. 5A through 5C) that precludes further rotation of the locking sleeve 220 in the counter-clockwise direction.

Referring to FIG. 5B, an aperture 228 is provided in the end of the locking sleeve 220 proximate the second end 106 of the body 102 (the upper end in the perspectives of FIGS. 5A through 5C). The aperture 228 is configured to allow the nose 108 at the second end 106 of the body 102 to pass therethrough when the aperture 228 is aligned with the nose 108, as shown in FIG. 5A. The aperture 228 is aligned with the nose 108 when the locking sleeve 220 is in the retainable unlocked position shown in FIG. 5A. Thus, when the locking sleeve 220 is in the retainable unlocked position shown in FIG. 5A, a user of the carabiner 200 can pull the locking sleeve 220 and the gate 110 into an interior area enclosed by the body 102 of the carabiner 200. In other words, a user can move the gate 110 into the open position shown in FIG. 5B when the locking sleeve 220 is in the retainable unlocked position shown in FIG. 5A.

Referring to FIG. 5B, as long as the locking sleeve 220 is not moved out of the retainable unlocked position shown in FIG. 5A relative to the gate 110 (i.e., as long as the head 132 of the pin member 130 remains disposed within the first notch 222 within the aperture 221 of the locking sleeve 220), the gate 110 can be freely moved back and forth between the closed position shown in FIG. 5A and an open position as shown in FIG. 5B.

In some embodiments, the carabiner 200 may be configured such that, as the gate 110 is moved into the open position shown in FIG. 5B, the head 132 of the pin member may be urged out from the notch 222 in the lower surface 227 of the locking sleeve 220 within the elongated aperture 221 if the gate 110 (and the locking sleeve 220) is pivoted to or beyond a threshold angle relative to the body 102 of the carabiner 200. By way of example and not limitation, the locking sleeve 220 and the body 102 may be sized and configured such that, as the gate 110 and locking sleeve 220 are pivoted to a threshold angle relative to the body 102 of the carabiner 200, as shown in FIG. 5B, an upper surface 250 of the locking sleeve 220 will abut against the body 102 proximate at a pinch point 240. If the gate 110 and the locking sleeve 220 are further pivoted inward beyond the threshold angle relative to the body 102, the contact between the body 102 and the locking sleeve 220 at the pinch point 240 will cause the locking sleeve 220 to slide longitudinally along the gate 110 toward the first end 104 of the body 102 and the pin member such that the head 132 of the pin member is urged out from the first notch 222 within the elongated aperture 221 of the locking sleeve 220. After the head 132 of the pin member is urged out from the first notch 222 within the elongated aperture 221 of the locking sleeve 220, the spring member between the gate 110 and the locking sleeve 220 will prevent the head 132 of the pin member from returning to the notch 222 in the absence of an applied external force, and will urge the locking sleeve 220 to rotate to the locked position shown in FIG. 5C.

When the gate 110 (and the locking sleeve 220) is in the open position shown in FIG. 5B, a projection 226 of the locking sleeve 220 that extends downward (from the perspective of FIG. 5B) past the pin member 130 and laterally beside the first end 104 of the body 102, prevents the locking sleeve 220 from rotating about the gate 110 responsive to the forces applied by the spring member until the gate 110 (and the locking sleeve 220) has pivoted back toward the closed position to an extent that the nose 108 of the second end 106 of the body 102 has passed at least partially through the aperture 228 in the end of the locking sleeve 220 proximate the second end 106 of the body 102. Stated another way, the projection 226 may be sized and configured to pass over the body 102 only after the gate 110 (and the locking sleeve 220) has pivoted back toward the closed position and the nose 108 has passed at least partially through the aperture 228 in the locking sleeve 220. Thus, the projection 226 maintains the aperture 228 in the locking sleeve 220 in alignment with the nose 108 until the nose 108 has passed at least partially through the aperture 228. If the aperture 228 were not maintained in alignment with the nose 108 until the nose 108 had passed at least partially through the aperture 228, the spring member could cause the locking sleeve 220 to rotate relative to the gate 110 such that the aperture 228 were not aligned with the nose 108, in which case interference between the nose 108 and the end of the locking sleeve 220 proximate the second end 106 of the body 102 would prevent the gate 110 (and the locking sleeve 220) from returning to the closed position.

As the projection 226 clears the body 102, the nose 108 will be partially disposed within the aperture 228. Interference between the nose 108 and the surfaces of the locking sleeve 220 within the aperture 228, however, will prevent the locking sleeve 220 from further rotation about the gate 110 response to the forces acting on the locking sleeve 220 until the nose 108 has passed entirely through the aperture 228 in the locking sleeve 220 and into the receptacle in the gate 110.

As the gate 110 moves from the open position shown in FIG. 5B into the closed position shown in FIG. 5C, the nose 108 of the second end 106 of the body 102 will pass entirely through the aperture 228 in the locking sleeve 220, at which point, the spring member between the gate 110 and the locking sleeve 220 will cause the locking sleeve 220 to further rotate in the counter-clockwise direction about the gate 110 until the head 132 of the pin member is forced into a second notch 224 in the lower surface 227 of the locking sleeve 220 within the elongated aperture 221. The end of the elongated aperture 221 adjacent the second notch 224 prevents further rotation of the locking sleeve 220 about the gate 110 in the counter-clockwise direction. When the head 132 of the pin member is disposed within the second notch 224, the locking sleeve 220 is in a locked position in which the aperture 228 is not aligned with the nose 108 and the end of the locking sleeve 220 proximate the second end 106 of the body 102 locks the gate 110 to the nose 108 in the closed position. Thus, when the gate 110 is closed and the locking sleeve 220 is in the locked position, as shown in FIG. 5C, the locking sleeve 220 prevents the gate 110 from inadvertently being opened.

To unlock the locking sleeve 220 and open the gate 110, a user may apply a force to the locking sleeve 220 to move the locking sleeve 220 out of the locked position shown in FIG. 5C and to rotate the locking sleeve 220 about the gate 110 until the aperture 228 in the locking sleeve 220 is aligned with the nose 108, at which point the gate 110 may be opened. In particular, a user may apply a force to the locking sleeve 220 to cause the locking sleeve 220 to slide longitudinally along the gate 110 toward the first end 104 of the body 102, and to cause the locking sleeve 220 to rotate in the clockwise direction about the gate 110 in such a manner as to cause the head 132 of the pin member to be dislodged out of the second notch 224, to align the aperture 228 with the nose 108, and to open the gate 110.

Optionally, a user may move the locking sleeve 220 from the locked position shown in FIG. 5C to the retainable unlocked position shown in FIG. 5A, in which the head 132 of the pin member is lodged within the first notch 222 in the locking sleeve 220. If the user lodges the head 132 of the pin member within the first notch 222 in the locking sleeve 220 before or after moving the gate 110 to the open position, the locking sleeve 220 may be freely opened and closed, as previously described herein, without causing the locking sleeve 220 to move into the locked position (shown in FIG. 5C) until the locking sleeve 220 is pivoted relative to the body 102 beyond the threshold angle. If, however, the user does not lodge the head 132 of the pin member within the first notch 222 in the locking sleeve 220 before or after moving the gate 110 to the open position, the locking sleeve 220 will return to the locked position shown in FIG. 5C when the gate 110 returns to the closed position after the user opens the gate 110.

Figure 6A:
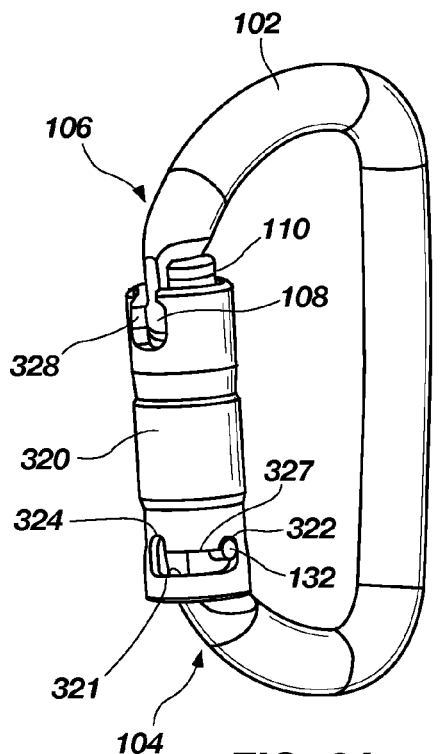
FIGS. 6A through 6C illustrate another embodiment of a carabiner of the present invention.
Figure 6B:
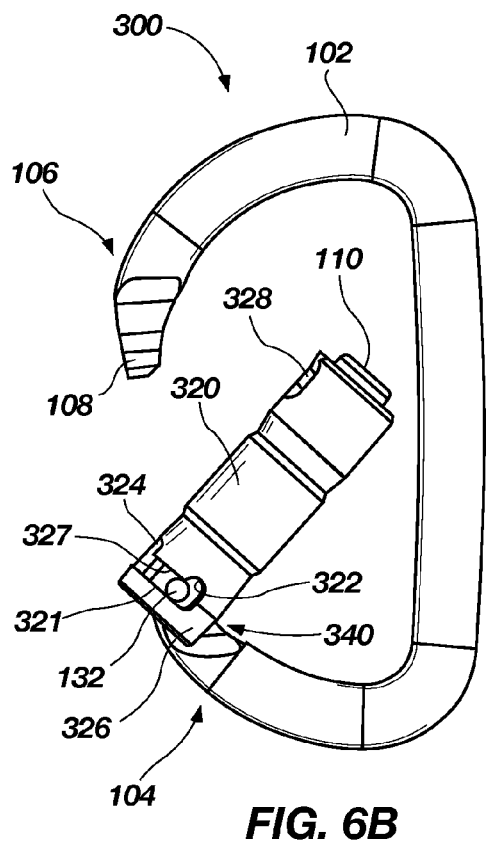
Figure 6C:
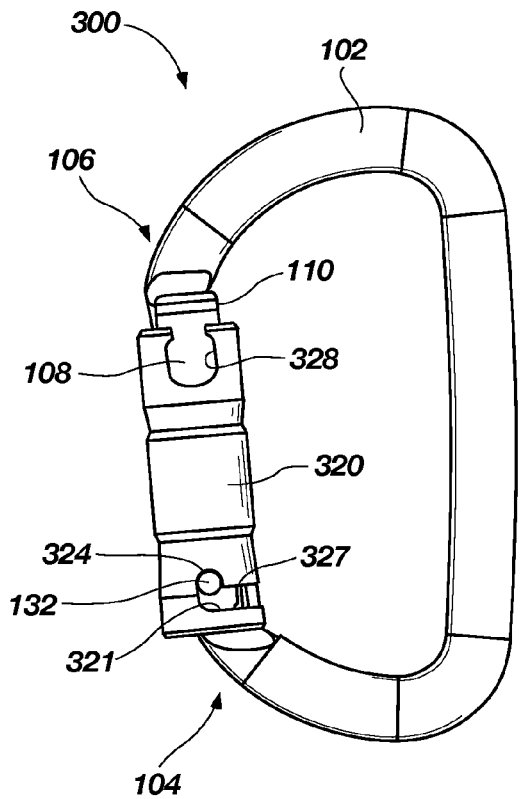

FIGS. 6A through 6C illustrate another embodiment of a carabiner 300 of the present invention. The carabiner 300 is generally similar to the carabiner 100 previously described with reference to FIGS. 1A-1C, and has a generally C-shaped body 102 and a gate 110 like those of the carabiner 100. The carabiner 300 also includes a locking sleeve 320 that is movable between a locked position and a retainable unlocked position. Like the locking sleeve 120 of the carabiner 100, the locking sleeve 320 of the carabiner 300 is biased toward the first end 104 of the body 102. FIG. 6A illustrates the carabiner 300 with the gate 110 in the closed position and the locking sleeve 320 retained in a retainable unlocked position. FIG. 6B illustrates the carabiner 300 with the gate 110 in an open position and the locking sleeve 320 in the process of being urged out from the retainable unlocked position. FIG. 6C illustrates the carabiner 300 with the gate 110 in the closed position and the locking sleeve 320 in the locked position.

Referring to FIG. 6A, the lower end of the gate 110 may be pivotally attached to the first end 104 of the body 102 using, for example, a pin member (e.g., a rivet) (like the pin member 130 of FIGS. 1A through 1C) that extends through the first end 104 of the body 102 and through the lower end of the gate 110. The pin member may include a head 132 that projects laterally outward from the first end 104 of the body 102 on one side thereof (e.g., the side shown in FIG. 6A). The head 132 of the pin member may interact with features of the locking sleeve 320, as discussed in further detail herein below.

The second end 106 of the body 102 may include a nose 108 that is configured to be received within a receptacle (not visible in FIGS. 6A through 6C) (like the receptacle 112 shown in FIG. 4) formed in the upper end of the gate 110 when the gate 110 is in the closed position. An aperture 328 is formed in the upper end of the locking sleeve 320 to allow the nose 108 to be received into the receptacle of the gate 110 as the gate 110 moves from the open position into the closed position, but the upper end of the gate 110 may by configured to preclude the nose 108 from passing entirely through the upper end of the gate 110.

The locking sleeve 320 is carried by, and positioned concentrically about, the gate 110. The locking sleeve 320 and the gate 110 are configured such that the locking sleeve 320 can rotate circumferentially about the gate 110, and such that the locking sleeve 320 can slide longitudinally along the gate 110.

A spring member (like the spring member 138 of FIG. 4) is disposed between the gate 110 and the locking sleeve 320. The spring member is hidden from view in FIGS. 6A through 6C. The spring member may comprise a torsion spring that acts on both the gate 110 and the locking sleeve 320 in a similar manner as does the spring member 138 of carabiner 100, so as to bias the locking sleeve 320 toward the first end 104 of the body 102 (the downward direction from the perspectives of FIGS. 6A through 6C), and also to rotationally bias the locking sleeve 320 in a counter-clockwise rotational direction about the gate 110 (when looking at the end surfaces of the gate 110 and locking sleeve 320 proximate the second end 106 of the body 102).

With continued reference to FIG. 6A, an elongated aperture 321 (e.g., a slot) is formed through the locking sleeve 320 near the end thereof proximate the first end 104 of the body 102, and the locking sleeve 320 is assembled with the gate 110 and the pin member such that the head 132 of the pin member is disposed within the elongated aperture 321. Thus, in the absence of an applied external force, the spring member forces the locking sleeve 320 toward the first end 104 of the body 102 (in the downward direction in the perspectives of FIGS. 6A through 6C) to cause an upper surface 327 of the locking sleeve 320 within the elongated aperture 321 to abut against the head 132 of the pin member, which prevents the locking sleeve 320 from further movement toward the second end 104 of the body 102. A user, however, can apply an external force to the locking sleeve 320 to cause the locking sleeve 320 to slide toward the second end 106 of the body 102 (in the upward direction in the perspectives of FIGS. 6A through 6C).

Also, in the absence of an applied external force, the spring member forces the locking sleeve 320 to rotate in the counter-clockwise direction (when looking at the end surfaces of the gate 110 and locking sleeve 320 proximate the second end 106 of the body 102). The upper surface 327 of the locking sleeve 320 is configured with a profile that includes features configured to interact with the head 132 of the pin member in such a manner as to preclude rotation of the locking sleeve 320 about the gate 110 in the absence of an applied external force. For example, the upper surface 327 of the locking sleeve 320 within the elongated aperture 321 includes a first notch 322 (e.g., an indentation) shown in FIGS. 6A and 6B. When the locking sleeve 320 is in the retainable unlocked position shown in FIG. 5A, the head 132 of the pin member is disposed within the first notch 322. As the spring member forces the upper surface 327 of the locking sleeve 320 within the notch 322 against the head 132 of the pin member, the notch 322 prevents the locking sleeve 320 from rotating in the counter-clockwise direction responsive to the rotational forces applied to the locking sleeve 320 by the spring member. If, however, the locking sleeve 320 is moved relative to the gate 110 such that the head 132 of the pin member is not disposed within the first notch 322, the spring member may urge the locking sleeve 320 to rotate in the counter-clockwise direction about the gate 110 until the head 132 of the pin member impinges on another feature of the upper surface 327 of the locking sleeve 320 within the elongated aperture 321 (e.g., a second notch 324 shown in FIGS. 6A and 6C) that precludes further rotation of the locking sleeve 320 in the counter-clockwise direction.

Referring to FIG. 6B, an aperture 328 is provided in the end of the locking sleeve 320 proximate the second end 106 of the body 102 (the upper end in the perspectives of FIGS. 6A through 6C). The aperture 328 is configured to allow the nose 108 at the second end 106 of the body 102 to pass therethrough when the aperture 328 is aligned with the nose 108, as shown in FIG. 6A. The aperture 328 is aligned with the nose 108 when the locking sleeve 320 is in the retainable unlocked position shown in FIG. 6A. Thus, when the locking sleeve 320 is in the retainable unlocked position shown in FIG. 6A, a user of the carabiner 300 can move the gate 110 into the open position shown in FIG. 6B.

Referring to FIG. 6B, as long as the locking sleeve 320 is not moved out of the retainable unlocked position shown in FIG. 6A relative to the gate 110 (i.e., as long as the head 132 of the pin member 130 remains disposed within the first notch 322 within the aperture 321 of the locking sleeve 320), the gate 110 can be freely moved back and forth between the closed position shown in FIG. 6A and an open position as shown in FIG. 6B.

In some embodiments, the carabiner 300 may be configured such that, as the gate 110 is moved into the open position shown in FIG. 6B, the head 132 of the pin member may be urged out from the notch 322 in the upper surface 327 of the locking sleeve 320 within the elongated aperture 321 if the gate 110 (and the locking sleeve 320) is pivoted to or beyond a threshold angle relative to the body 102 of the carabiner 300. By way of example and not limitation, the locking sleeve 320 and the first end 104 of the body 102 may be sized and configured such that, as the gate 110 (and locking sleeve 320) is pivoted to a threshold angle relative to the body 102 of the carabiner 300, as shown in FIG. 6B, a lower surface of the locking sleeve 320 will abut against the body 102 proximate the first end 104 thereof at a pinch point 340. If the gate 110 (and locking sleeve 320) is further pivoted inward beyond the threshold angle relative to the body 102, the contact between the body 102 and the locking sleeve 320 at the pinch point 340 will cause the locking sleeve 320 to slide longitudinally along the gate 110 toward the second end 106 of the body 102 and away from the pin member such that the head 132 of the pin member is urged out from the first notch 322 within the elongated aperture 321 of the locking sleeve 320. After the head 132 of the pin member is urged out from the first notch 322 within the elongated aperture 321 of the locking sleeve 320, the spring member between the gate 110 and the locking sleeve 320 will prevent the head 132 of the pin member from returning to the notch 322 in the absence of an applied external force, and will urge the locking sleeve 320 to rotate to the locked position shown in FIG. 6C.

When the gate 110 (and the locking sleeve 320) is in the open position shown in FIG. 6B, a projection 326 of the locking sleeve 320 that extends downward (from the perspective of FIG. 6B) past the pin member and laterally beside the first end 104 of the body 102, prevents the locking sleeve 320 from rotating about the gate 110 responsive to the forces applied by the spring member until the gate 110 (and the locking sleeve 320) has pivoted back toward the closed position to an extent that the nose 108 of the second end 106 of the body 102 has passed at least partially through the aperture 328 in the end of the locking sleeve 320 proximate the second end 106 of the body 102. Stated another way, the projection 326 may be sized and configured to pass over the body 102 only after the gate 110 (and the locking sleeve 320) has pivoted back toward the closed position and the nose 108 has passed at least partially through the aperture 328 in the locking sleeve 320. Thus, the projection 326 maintains the aperture 328 in the locking sleeve 320 in alignment with the nose 108 until the nose 108 has passed at least partially through the aperture 328. If the aperture 328 were not maintained in alignment with the nose 108 until the nose 108 had passed at least partially through the aperture 328, the spring member could cause the locking sleeve 320 to rotate relative to the gate 110 such that the aperture 328 were not aligned with the nose 108, in which case interference between the nose 108 and the end of the locking sleeve 320 proximate the second end 106 of the body 102 would prevent the gate 110 (and the locking sleeve 320) from returning to the closed position.

As the projection 326 clears the body 102, the nose 108 will be partially disposed within the aperture 328. Interference between the nose 108 and the surfaces of the locking sleeve 320 within the aperture 328, however, will prevent the locking sleeve 320 from further rotation about the gate 110 response to the forces acting on the locking sleeve 320 until the nose 108 has passed entirely through the aperture 328 in the locking sleeve 320 and into the receptacle in the gate 110.

As the gate 110 moves from the open position shown in FIG. 6B into the closed position shown in FIG. 6C, the nose 108 of the second end 106 of the body 102 will pass entirely through the aperture 328 in the locking sleeve 320, at which point, the spring member between the gate 110 and the locking sleeve 320 will cause the locking sleeve 320 to further rotate in the counter-clockwise direction about the gate 110 until the head 132 of the pin member is forced into a second notch 324 in the upper surface 327 of the locking sleeve 320 within the elongated aperture 321. The end of the elongated aperture 321 adjacent the second notch 324 prevents further rotation of the locking sleeve 320 about the gate 110 in the counter-clockwise direction. When the head 132 of the pin member is disposed within the second notch 324, the locking sleeve 320 is in a locked position in which the aperture 328 is not aligned with the nose 108 and the end of the locking sleeve 320 proximate the second end 106 of the body 102 locks the gate 110 to the nose 108 in the closed position. Thus, when the gate 110 is closed and the locking sleeve 320 is in the locked position, as shown in FIG. 6C, the locking sleeve 320 prevents the gate 110 from inadvertently being opened.

To unlock the locking sleeve 320 and open the gate 110, a user may apply a force to the locking sleeve 320 to move the locking sleeve 320 out of the locked position shown in FIG. 6C and to rotate the locking sleeve 320 about the gate 110 until the aperture 328 in the locking sleeve 320 is aligned with the nose 108, at which point the gate 110 may be opened. In particular, a user may apply a force to the locking sleeve 320 to cause the locking sleeve 320 to slide longitudinally along the gate 110 toward the second end 106 of the body 102, and to cause the locking sleeve 320 to rotate in the clockwise direction about the gate 110 in such a manner as to cause the head 132 of the pin member to be dislodged out of the second notch 324, to align the aperture 328 with the nose 108, and to open the gate 110.

Optionally, a user may move the locking sleeve 320 from the locked position shown in FIG. 6C to the retainable unlocked position shown in FIG. 6A, in which the head 132 of the pin member is lodged within the first notch 322 in the locking sleeve 320. If the user lodges the head 132 of the pin member within the first notch 322 in the locking sleeve 320 before or after moving the gate 110 to the open position, the locking sleeve 320 may be freely opened and closed, as previously described herein, without causing the locking sleeve 320 to move into the locked position (shown in FIG. 6C) until the locking sleeve 320 is pivoted relative to the body 102 beyond the threshold angle. If, however, the user does not lodge the head 132 of the pin member within the first notch 322 in the locking sleeve 320 before or after moving the gate 110 to the open position, the locking sleeve 320 will return to the locked position shown in FIG. 6C when the gate 110 returns to the closed position after the user opens the gate 110.

Thus described, embodiments of carabiners of the present invention may be said to be operable in each of a "manual" mode and an "automatic" mode. For example, when the locking sleeve 120, 220, 320 of the carabiner 100, 200, 300 is in the retainable unlocked position relative to the gate 110 (i.e., when the head 132 of the pin member 130 is disposed within the first notch 122, 222, 322 of the locking sleeve 120, 220, 320), the carabiner 100, 200, 300 may be said to be operable in a manual mode in which the gate 110 may be manually moved back and forth between the open and closed position, so long as the gate 110 is not pivoted beyond the threshold angle relative to the body 102 of the carabiner 100, 200, 300, and the head 132 of the pin member 130 is not dislodged from the first notch 122, 222, 322. To operate the carabiner 100, 200, 300 in the automatic mode, the gate 110 may be opened and pivoted relative to the body 102 of the carabiner 100, 200, 300 beyond the threshold angle to urge the head 132 of the pin member 130 out of the first notch 122, 222, 322, or the locking sleeve 120, 220, 320 may simply be moved by a user from the retainable unlocked position to the locked position without opening the gate 110. As a result, the locking sleeve 120, 220, 320 will automatically move to the locked position the next time the gate 110 returns to the closed position.

Although the foregoing description contains many specifics, these are not to be construed as limiting the scope of the present invention, but merely as providing examples of certain embodiments of the invention. Additional embodiments of the invention may be devised which do not depart from the spirit or scope of the invention. The scope of the invention is, therefore, indicated and limited only by the appended claims and their legal equivalents, rather than by the foregoing description of certain embodiments of the invention.

What is claimed is:

1. A carabiner comprising:
a body having a first end and a second end;
a gate pivotally attached to the first end of the body and movable between a closed position and an open position, the gate extending from the first end of the body to the second end of the body in the closed position; and
a locking member movable between a locked position and a retainable unlocked position, the locking member being biased to the locked position and configured to prevent the gate from opening when the gate is in the closed position and the locking member is in the locked position and to allow the gate to open when the gate is in the closed position and the locking member is in the retainable unlocked position, wherein pivoting the gate relative to the body of the carabiner beyond a threshold angle upon opening the gate causes the locking member to move out of the retainable unlocked position.

2. The carabiner of claim 1, wherein the locking member comprises a locking sleeve concentrically disposed about the gate.

3. The carabiner of claim 2, further comprising a spring member disposed between the gate and the locking sleeve, the spring member biasing the locking sleeve to the locked position.

4. The carabiner of claim 3, wherein the locking sleeve is configured to slide longitudinally along the gate, and wherein the spring member is configured to bias the locking sleeve toward the first end of the body.

5. The carabiner of claim 3, wherein the locking sleeve is configured to slide longitudinally along the gate, and wherein the spring member is configured to bias the locking sleeve toward the second end of the body.

6. The carabiner of claim 3, wherein the spring member comprises a torsion spring.

7. The carabiner of claim 6, further comprising a pin member extending at least partially through the first end of the body and the gate, the gate being pivotally attached to the first end of the body by the pin member, and wherein the pin member comprises a head projecting laterally from the first end of the body.

8. The carabiner of claim 7, wherein a surface of the locking sleeve is configured to abut against the head of the pin member.

9. The carabiner of claim 8, wherein the surface of the locking sleeve is configured to define a notch in the locking sleeve, and wherein the head of the pin member is disposed at least partially within the notch in the locking sleeve when the locking sleeve is in the locked position.

10. The carabiner of claim 9, wherein the surface of the locking sleeve is configured to define another notch in the locking sleeve, and wherein the head of the pin member is disposed at least partially within the another notch in the locking sleeve when the locking sleeve is in the retainable unlocked position.

11. The carabiner of claim 3, wherein the locking sleeve comprises an aperture proximate an end thereof sized and configured to allow at least a portion of the second end of the body to pass therethrough when the aperture is aligned with the at least a portion of the second end of the body.

12. The carabiner of claim 11, wherein the aperture is aligned with the at least a portion of the second end of the body when the locking sleeve is in the retainable unlocked position, and wherein the aperture is not aligned with the at least a portion of the second end of the body when the locking sleeve is in the locked position.

13. The carabiner of claim 12, further comprising at least one feature configured to prevent the locking sleeve from rotating about the gate unless the at least a portion of the second end of the body is disposed at least partially within the aperture.

14. A method of manufacturing a carabiner including a body having a first end and a second end, comprising:
pivotally attaching a gate to a first end of a body of a carabiner;
configuring the gate and the body of the carabiner to allow the gate to pivot between a closed position and an open position when the gate is pivotally attached to the first end of the body;
configuring the gate and the body of the carabiner to cause the gate to extend from the first end of the body to a second end of the body when the gate is in the closed position;
attaching a locking member to at least one of the gate and the body of the carabiner;
configuring the locking member to move relative to the gate between a locked position and a retainable unlocked position, to prevent the gate from opening when the gate is in the closed position and the locking member is in the locked position, and to allow the gate to open when the gate is in the closed position and the locking member is in the retainable unlocked position;
biasing the locking member to the locked position; and configuring the locking member such that pivoting the gate relative to the body of the carabiner beyond a threshold angle causes the locking member to move out of the retainable unlocked position.

15. The method of claim 14, wherein attaching a locking member to at least one of the gate and the body of the carabiner comprises positioning the locking member concentrically about the gate.

16. The method of claim 15, wherein biasing the locking member to the locked position comprises positioning a spring member between the gate and the locking member and configuring the spring member to act on the locking member.

17. The method of claim 16, further comprising configuring the locking member and the gate to allow the locking member to slide longitudinally along the gate, and further comprising configuring the spring member to force the locking member toward the first end of the body.

18. The method of claim 16, further comprising configuring the locking member and the gate to allow the locking member to slide longitudinally along the gate, and further comprising configuring the spring member to force the locking member toward the second end of the body.

19. The method of claim 14, wherein pivotally attaching a gate to a first end of a body of a carabiner comprises attaching the gate to the first end of the body with a pin member extending at least partially through the first end of the body and the gate.

20. The method of claim 19, further comprising providing a head on the pin member and configuring the head to project laterally from the first end of the body.

21. The method of claim 20, further comprising configuring a surface of the locking member to abut against the head of the pin member.

22. The method of claim 21, further comprising:
defining a notch in the surface of the locking member; and
configuring the locking member and the pin member to cause the head of the pin member to be disposed at least partially within the notch in the surface of the locking member when the locking member is in the locked position.

23. The method of claim 22, further comprising:
defining another notch in the surface of the locking member; and
configuring the locking member and the pin member to cause the head of the pin member to be disposed at least partially within the another notch in the surface of the locking member when the locking member is in the retainable unlocked position.

* * * * *